US006525645B2

(12) United States Patent
King et al.

(10) Patent No.: US 6,525,645 B2
(45) **Date of Patent: *Feb. 25, 2003**

(54) INTEGRATED REMOTE KEYLESS ENTRY AND GARAGE DOOR OPENER USING A UNIVERSAL REPEATER

(75) Inventors: Joseph D. King, Ann Arbor, MI (US); Ozer M. N. Teitelbaum, Farmington Hills, MI (US)

(73) Assignee: Lear Corporation, Southfield, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,710

(22) Filed: Aug. 26, 1998

(65) Prior Publication Data

US 2001/0011941 A1 Aug. 9, 2001

(51) Int. Cl.[7] .................................................. H04Q 9/00

(52) U.S. Cl. ...................... 340/5.7; 340/5.64; 340/5.71; 340/5.72; 340/426; 340/825.69; 340/825.72; 307/10.4; 307/10.5

(58) Field of Search ............................ 340/426, 825.31, 340/825.69, 825.72, 5.7, 5.64, 5.71, 5.72; 307/10, 10.5, 10.4

(56) References Cited

U.S. PATENT DOCUMENTS 5,134,392 A * 7/1992 Takeuchi et al. ....... 340/825.69
5,552,641 A * 9/1996 Fisher et al. ............... 307/10.5
5,583,485 A * 12/1996 Van Lente et al. .......... 340/525
5,661,804 A 8/1997 Dykema et al. .............. 380/21
5,722,058 A * 2/1998 Umemoto et al. ..... 340/825.72

FOREIGN PATENT DOCUMENTS

| | | | |
|---|---|---|---|
| DE | 4328392 | * | 3/1995 |
| EP | 0 440 971 | | 8/1991 |
| EP | 0440974 | * | 8/1991 |
| EP | 0801387 | * | 3/1995 |
| EP | 08013874 | | 1/1996 |
| GB | 2276023 | * | 9/1994 |

OTHER PUBLICATIONS

International Search Report in International Application No. PCT/US99/19679, Dec. 1999.*

Hilde Post, “Maschinen Kommunizieren Drahtlos”, vol. 41, No. 26, pp. 116–122, May 1992.*

International Search Report Dated Dec. 14, 1999, in International Application No. PCT/US99/19679.

Hilde Post, “Maschinen kommunizieren drahtlos”, May 26, 1992, vol. 41, No. 26, pp. 116–122.

* cited by examiner

*Primary Examiner*—Brian Zimmerman
*Assistant Examiner*—Yves Dalencourt
(74) *Attorney, Agent, or Firm*—MacMillan, Sobanski & Todd, LLC

(57) ABSTRACT

A vehicle wireless transmitter system includes a portable fob and a repeater mounted in the vehicle headliner. The portable fob includes user actuated buttons and code generation circuitry for a remote keyless entry system, garage door opener system, and home security system. When the user activates the garage door opener button on the portable fob from within the vehicle, the code generated by the portable fob is repeated by the repeater mounted in the vehicle headliner and retransmitted in a more powerful signal directed through the windshield. Thus, the portable fob insures that the code generation circuitry is removed from the vehicle with the user, while the repeater insures that the transmitted signal has enough power to provide satisfactory range.

9 Claims, 1 Drawing Sheet

INTEGRATED REMOTE KEYLESS ENTRY AND GARAGE DOOR OPENER USING A UNIVERSAL REPEATER

BACKGROUND OF THE INVENTION

The present invention relates generally to wireless transmitters for vehicles and more particularly to a system which provides a universal remote keyless entry and garage door opener transmitter.

The overwhelming majority of new homes built are being constructed with garage door openers with remote controllers using RF wireless technology. Many existing homes are also being upgraded with garage door openers using RF wireless technology for accomplishing the remote function. Typically, a portable RF transmitter is utilized to activate the garage door opener to open and close the garage door. Users usually keep the RF transmitter in the vehicle.

The current trend in automotive market is to provide new vehicles with factory installed universal garage door opener transmitters. This has several drawbacks, including the potential compromise in security. If the vehicle is stolen, the thief can obtain the owner's address from the glove compartment, drive to the residence and use the factory installed garage door opener to open the door. The same concern applies to portable RF transmitters which are normally left in the vehicle.

SUMMARY OF THE INVENTION

The present invention provides a portable fob having integrated remote keyless entry and garage door opener transmitters. This eliminates the need for a separate garage door opener transmitter in the vehicle. Further, the code generation circuitry for the garage door opener, including any encryption circuitry, would be removed from the vehicle with the user. As a result, a thief in a stolen vehicle would not have access to the code generation circuitry and encryption circuitry necessary to open the owner's garage door.

In order to provide the range that customers demand for activating garage door openers, a universal repeater is preferably mounted in the headliner of the vehicle. The repeater receives and retransmits wireless signals of certain frequencies associated with garage door openers. Thus, when the user activates the fob from within the vehicle, the fob generates a wireless signal including the code necessary to activate the garage door opener. This wireless signal is received by the repeater. The repeater retransmits the code in a stronger wireless signal that is directed through the windshield of the vehicle.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
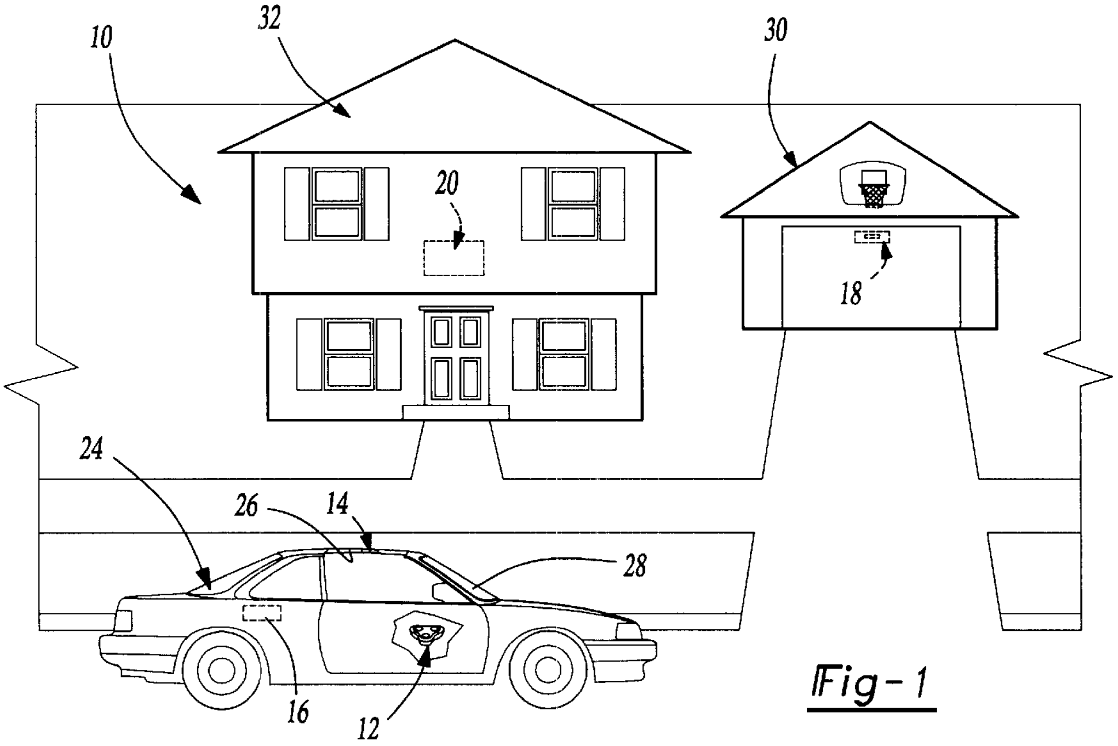
FIG. 1 illustrates the vehicle transmitter system of the present invention and three exemplary security systems for use with the present invention.

FIG. 1 illustrates a wireless communication system 10 of the present invention generally comprising a portable fob

12, a repeater 14, a remote keyless entry system 16, a garage door opener 18 and a home security system 20. The repeater 14 is mounted in a vehicle 24, most preferably in the vehicle headliner 26. From the vehicle headliner 26, the repeater 14 has good access to receive wireless signals from the portable fob 12 from within the interior of the vehicle 24, particularly in its normal position adjacent a key in the ignition of the vehicle 24. Also, from the position in the headliner 26, the repeater 14 has a clear line of sight through the windshield 28 of the vehicle 24 through which to transmit wireless signals, such as RF or infrared signals.

The garage door opener 18 is mounted in a garage 30 for activating (i.e. opening and closing) a garage door. The home security system 20 is mounted in a home 32 and activates (i.e. permits or restricts access to) the home 32. Most likely, the home 32 is associated with the garage 30.

The remote keyless entry system 16, garage door opener system 18 and home security system 20 are all as is known in the art and commonly available to consumers. Preferably, the systems 16, 18 and 20 are RF systems which are activated upon receiving a wireless signal including a proper code. Each system 16, 18 and 20 may operate on a different frequency, but preferably utilizing the same technology, i.e. RF or infrared, etc. Further, each of the systems 16, 18 and 20 preferably operates utilizing independently encrypted codes or rolling codes to prevent electronic eavesdropping of the transmitted signal. These code generation techniques are well known.

Figure 1A:
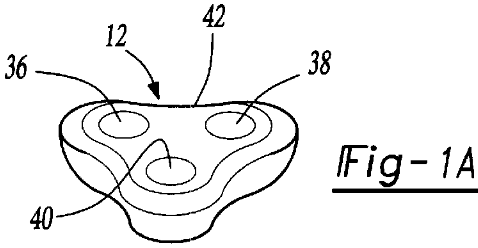
FIG. 1A is an enlarged view of the portable fob of FIG. 1.

The portable fob 12 is generally a transmitter of wireless signals of the same technology as the systems 16, 18 and 20. As can be seen in FIG. 1A, the fob 12 includes a plurality of user actuated buttons 36, 38 and 40 mounted in a housing 42. The user actuated buttons 36, 38 and 40 each cause the fob 12 to generate a code for activating one of the systems 16, 18 and 20, respectively.

Figure 2:
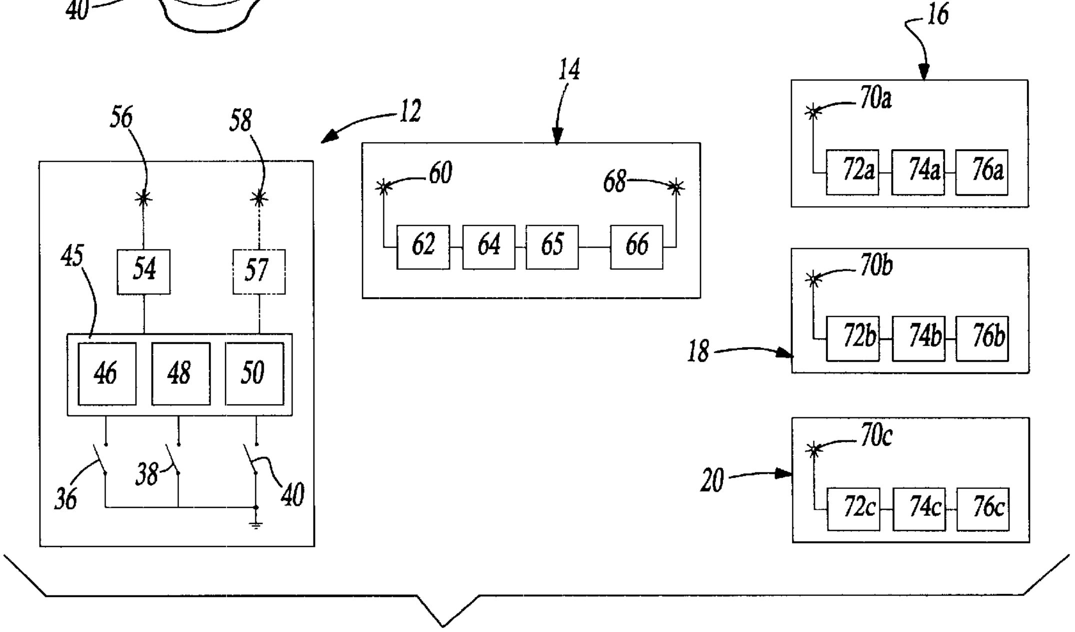
FIG. 2 is a schematic of the vehicle transmitter system and exemplary security systems of FIG. 1.

FIG. 2 is a schematic of the portable fob 12, repeater 14, remote keyless entry system 16, garage door opener 18 and home security system 20 of FIG. 1. Each of the buttons 36, 38 and 40 in the fob 12 selectively actuate code generation circuitry, preferably a microprocessor 45. The microprocessor 45 has data 46, 48 and 50 necessary for implementing encrypted or rolling codes for use with the systems 16, 18 and 20, respectively. The data 46, 48 and 50 could be provided in plug-in ROM modules to the microprocessor 45. Alternatively, the data 46, 48 and 50 could be learned in a learn mode and received by an optional receiver 57 and antenna 58. The data 46, 48 and 50 would include the encryption algorithms, frequency, modulation and any other information activate systems 16, 18 and 20, respectively. Once generated, the digital code is transmitted via the transmitter 54 and antenna 56, which may be particular to the particular technology utilized. The transmitter 54 could be a voltage controlled oscillator or several discrete oscillators for transmitting at different frequencies.

The repeater 14 includes a receiving antenna 60, preferably directed toward the interior of the vehicle 24 (FIG. 1). The receiving antenna 60 provides wireless signals to receiving circuitry 62 and a filter 64. The filter 64 includes circuitry and/or software for insuring that the repeater 14 only repeats specified frequencies, in particular frequencies associated with garage door openers. The digital code received by the repeater 14 from the fob 12 is stored by a microprocessor 65 and then duplicated exactly and retransmitted via a transmitter 66 and antenna 68. Preferably, transmission of the signal begins only after the entire signal is received. The microprocessor 65 could be replaced with hard circuitry performing the same function. Preferably the antenna 68 is directed through the windshield 28 of the vehicle 24 (FIG. 1).

The remote keyless entry system 16, garage door opener 18 and home security system 20 all are as known in the art. Each includes an antenna 70_a–c_ and receiving circuitry 72_a–c_. Each system further includes a code analyzer 74_a–c_, such as a microprocessor or circuitry, which determines whether the received digital code is valid. The code analyzer 74_a–c_ would include the necessary circuitry, software and data for implementing encryption or rolling codes, complementary to the data 46, 48 and 50, respectively, in the fob 12. Each system further includes an actuator 76_a–c_ which is activated when a proper code is received in the code analyzer circuitry 74_a–c_. In the remote keyless entry system 16, this would include the door lock actuators 76_a_. In the garage door opener 18, this would include the motor 76_b_ for opening the garage door. In the home security system 20, this would include actuators 76_c_ for locking and unlocking doors.

The operation of the present invention will be described with respect to FIG. 1. Initially, the fob 12 is programmed to operate with each of the systems 16, 18 and 20, including providing the encryption or rolling codes such as by plugging in the proper ROM modules 46, 48 and 50 or storing the information in a learning mode. The fob 12 is then placed in a "training" mode to synchronize each of the encryption algorithms with those in the systems 16, 18 and 20.

When the user approaches the vehicle 24 with the fob 12, the user activates button 36 on fob 12, causing the fob 12 to generate a wireless signal, preferably RF, containing a digital code which is then received by the remote keyless entry system 16. If the code is valid, the vehicle doors are unlocked.

When the user is in the vehicle 24 with the fob 12, the fob 12 is preferably hanging from a key in the ignition (not shown). When the vehicle 24 approaches the garage 30, the user activates the button 38 on the fob 12. In response, the fob 12 generates a first wireless signal containing the proper digital code for activating the garage door opener 18. This first wireless signal is received by the repeater 14. The repeater 14 recognizes the first wireless signal as having a frequency associated with the garage door opener and thus retransmits the exact same digital code through the windshield 28 of the vehicle 24 in a second wireless signal. The digital code in the second wireless signal is exactly the same as the digital code in the first wireless signal, but the second wireless signal has greater strength and is more particularly directed through the windshield 28 of the vehicle 24 for increased range. The digital code in the second wireless signal is received by the garage door opener 18, which in response activates the garage door.

When the user approaches the house 32 with the fob 12, the user activates the button 40 on the fob 12, thereby activating the home security system 20, generally in a manner similar to that described with respect to the remote keyless entry system 16, above, i.e. without the use of the repeater 14. Alternatively, the repeater 14, and more particularly the filter 64 in the repeater 14, can be modified to also recognize frequencies generally associated with home security systems.

When the user exits the vehicle 24, the user takes the fob 12. Thus, if the vehicle 24 is stolen, the thief would be unable to activate the garage door opener 18 or home security system 20. The thief would not have the code generation data 48 and 50 (FIG. 2) for activating these systems 18 and 20 respectively. The repeater 14, which is left in the vehicle 24, cannot be used by the thief to activate these systems 18 and 20. At the same time, the fob 12 can still be made small for the convenience of the user. The fob need only limited range for sending the first wireless signal to the repeater 14, and thus, has low power requirements. At the same time the repeater 14 provides the range that consumers desire. Generally, consumers desire the ability to activate the garage door opener 18 from far enough away from the garage 30 that the garage door will be opened by the time the vehicle 24 gets to the garage 30.

It should be recognized that the filter 64 in repeater 14 could be implemented solely with antenna 60 and/or receiver circuitry 62 and/or microprocessor 65. Further, the exact frequency of the garage door opener 18 could be specified to the repeater 14, such that the repeater 14 would only repeat signals of that frequency. The repeater 14 could be provided with a user input device, such as switches or knobs to indicate to the repeater 14 the frequency of the garage door opener 18. Alternatively, the repeater could include a learning mode in which its learns the exact frequency of the first wireless signal transmitted from the fob 12, wherein the repeater 14 would then only repeat the signals that it received at that learned frequency.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A vehicle transmitter system usable with a vehicle, the vehicle including a remote keyless entry system having a first receiving antenna mounted in the vehicle, said vehicle transmitter system comprising:

a portable fob, said fob including a plurality of user-actuated switches, code generating circuitry and a transmitter including a transmitting antenna, said transmitter being responsive to actuation of each of said user-actuated switches to cause said code-generating circuitry to selectively generate a respective one of a plurality of codes, a first code of said plurality of codes being associated with the vehicle remote keyless entry system of the vehicle and a second code of the plurality of codes being associated with a second remote system separate from the vehicle, said transmitter being for transmitting the generated code by said transmitting antenna, wherein the first code is receivable by the first receiving antenna of the remote keyless entry system mounted in the vehicle to cause activation of the remote keyless entry system; and a repeater, mounted in the vehicle, including a second receiving antenna separate from the first receiving antenna for receiving the second code, said repeater being responsive to receipt of the second code by said second receiving antenna to retransmit a third code to activate the second remote system, whereby two different receiving antennas in the vehicle receive respective independently encrypted codes from said portable fob.

2. A vehicle transmitter system of claim 1, wherein said repeater is permanently mounted in the vehicle.

3. The vehicle transmitter system of claim 2, wherein said repeater is mounted in a headliner of the vehicle.

4. The vehicle transmitter system of claim 1, wherein the plurality of codes are rolled by said code-generating circuitry.

5. The vehicle transmitter system of claim 1, wherein the second remote system is a garage door opener system.

6. The vehicle transmitter system of claim 1, wherein the second remote system is for use in a defined environment, and wherein said repeater includes a filter for filtering frequencies of received signals, wherein said filter filters out frequencies not associated with systems for use in the defined environment of the second remote system so that said repeater predominantly retransmits in response to codes received in signals at frequencies associated with the systems for use in the defined environment of the second remote system.

7. The vehicle transmitter system of claim 6, wherein the second remote system is a garage door opener system.

8. The vehicle transmitter system of claim 1, wherein the third code is digitally the same as the second code.

9. The vehicle transmitter system of claim 1, wherein said code-generating circuitry independently encrypts each of the plurality of codes.

* * * * *